No. 875,943. PATENTED JAN. 7, 1908.
D. N. McDANIEL.
SPRING PROPELLED HAND CAR.
APPLICATION FILED MAY 6, 1907.

2 SHEETS—SHEET 1.

WITNESSES: David N. McDaniel, INVENTOR

By C. A. Snow & Co.
ATTORNEYS

No. 875,943.
PATENTED JAN. 7, 1908.
D. N. McDANIEL.
SPRING PROPELLED HAND CAR.
APPLICATION FILED MAY 6, 1907.
2 SHEETS—SHEET 2.
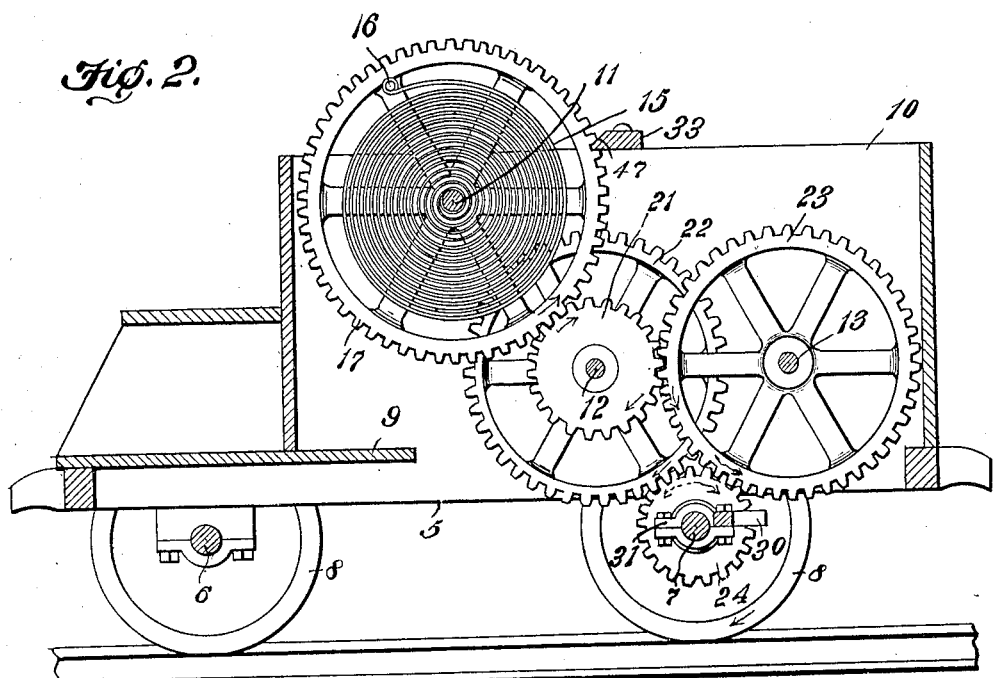
Fig. 2.
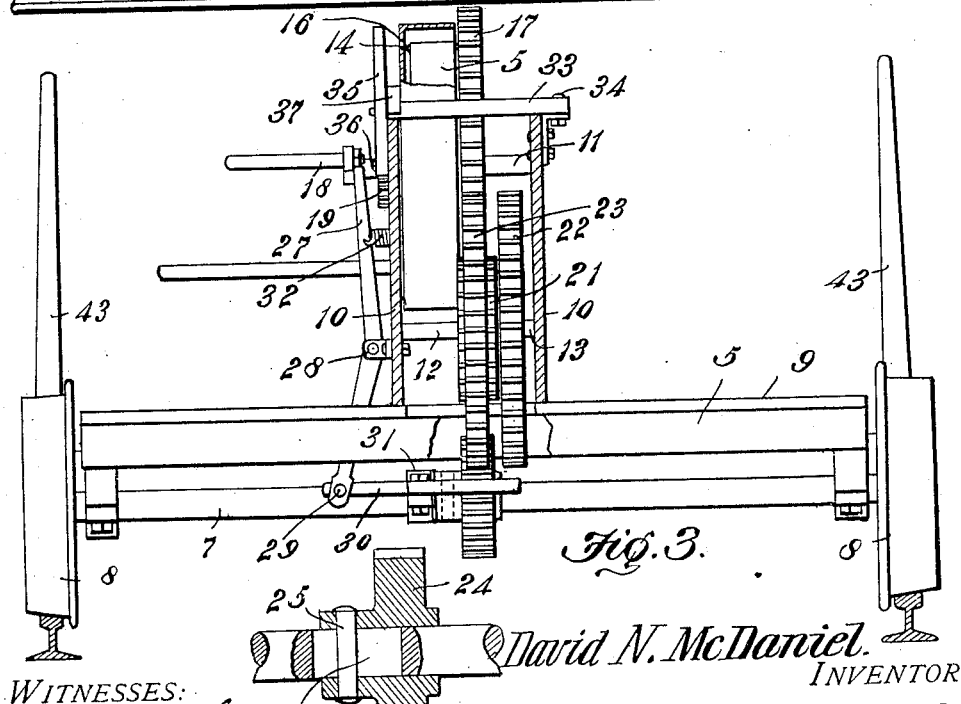
Fig. 3.
Fig. 5.
WITNESSES:
David N. McDaniel
INVENTOR
By C. A. Snow & Co
ATTORNEYS

UNITED STATES PATENT OFFICE.

DAVID N. McDANIEL, OF MILLWOOD, GEORGIA.

SPRING-PROPELLED HAND-CAR.

No. 875,943.  Specification of Letters Patent.  Patented Jan. 7, 1908.

Application filed May 6, 1907. Serial No. 372,143.

*To all whom it may concern:*

Be it known that I, DAVID N. McDANIEL, a citizen of the United States, residing at Millwood, in the county of Ware and State of Georgia, have invented a new and useful Spring-Propelled Hand-Car, of which the following is a specification.

This invention relates to rail-way hand cars, of that general class employed for transporting section hands or workmen from and to their place of work or for inspecting different portions of the rail-way track.

The object of the invention is to provide a hand car having a motive spring operatively connecting with the driving wheels whereby greater speed is attained than with the hand-cars now in use and with less exertion.

A further object of the invention is to provide means for reversing the direction of travel of the car, and novel means for starting and stopping the propelling mechanism.

A still further object of the invention is to simplify and improve the construction of this class of devices so as to add to their utility and durability as well as to reduce the cost of manufacture.

Further objects and advantages will appear in the following description it being understood that various changes in form, proportions and minor details of construction may be resorted to within the scope of the appended claims.

Figure 1:
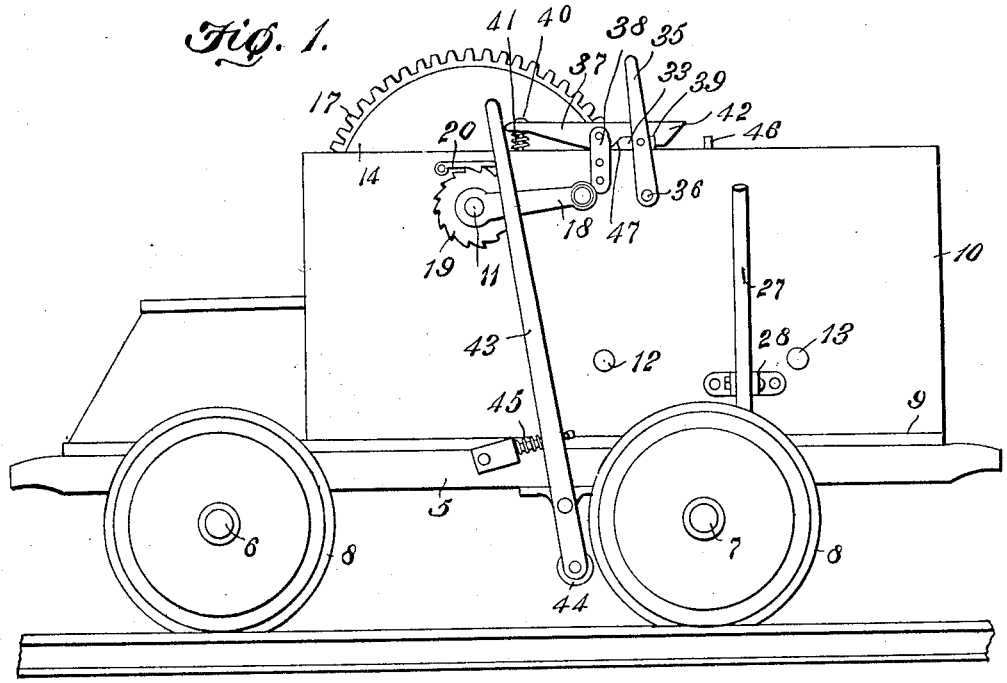
Figure 4:
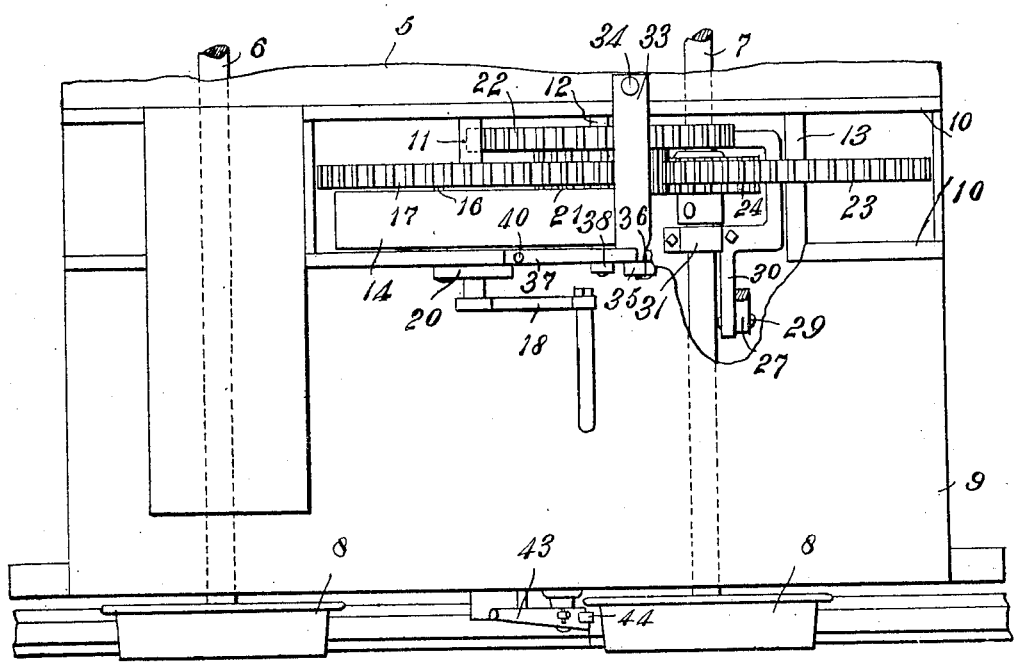

In the accompanying drawings forming a part of this specification: Figure 1 is a side elevation of a spring propelled hand-car constructed in accordance with my invention. Fig. 2 is a longitudinal sectional view of the same. Fig. 3 is an end view of a car and, Fig. 4 is a top plan view of a portion of the car.

Similar numerals of reference indicate corresponding parts in all of the figures of the drawings.

The car is principally designed for transporting section hands or workmen to and from their place of work and consists of a truck 5 provided with front and rear axles 6 and 7 upon which are mounted the traction wheels 8. Secured to the platform 9 of the car is a pair of spaced uprights or plates 10 in which are journaled a plurality of shafts indicated at 11, 12 and 13, respectively.

Secured to one of the plates 10 is a casing or housing 14 for the reception of a coil spring 15 one end of which is attached to the main operating shaft 11, while the opposite end thereof is secured to a pin 16 extending laterally from a master gear 17 loosely mounted for rotation on the shaft 11 as shown. The spring 15 is placed under tension to actuate the gear wheel 17 by means of a crank 18 carried by the shaft 11 and projecting laterally beyond the adjacent plate 10, said shaft being provided with a ratchet wheel 19 adapted to engage a pawl 20 for maintaining the spring under tension after the same has been wound.

The master gear 17 meshes with a pinion 21 mounted for rotation on the shaft 12 and secured to or formed integral with a gear wheel 22. Mounted for rotation on the shaft 13 is a gear wheel 23 which meshes with the pinion 21 and also with a similar pinion 24 slidably mounted on the rear axle 7 as shown. It will thus be seen that motion will be transmitted from the actuating spring through the medium of the pinion 21, gear wheel 23, and pinion 24 to the rear shaft 7 and thereby impart a forward movement to the truck or car. The pinion 24 is keyed to the shaft 7 by means of a pin 25 extending through a slot 26 formed in said shaft and is movable longitudinally of the shaft into engagement with the gear wheel 22 to reverse the direction of travel of the car by means of a hand operated lever 27. The lever 27 is pivotally mounted in a bracket 28 secured to one of the plates 10 and the lower end of the lever is pivoted at 29 to a rod 30 extending longitudinally of the shaft and coupled to a sliding collar 31 which engages one side of the pinion 24, the free end of the rod 31 being extended laterally for engagement with the opposite side of said pinion. It will thus be seen that when the free end of the lever 27 is moved outwardly against the tension of the spring 32 the pinion 24 will be moved into operative engagement with the gear wheel 22 and thus reverse the direction of travel of the car and when the lever is released the spring will automatically move the pinion into engagement with the teeth on gear wheel 23 causing a forward movement to be imparted to the car.

As a means for stopping and starting the propelling means there is provided a suitable brake mechanism consisting of a brake bar 33 one end of which is pivoted at 34 to the adjacent plate 10 while its opposite end is operatively connected with a lever 35 pivotally mounted at 36 to the opposite plate. The bar 33 is adapted to engage the teeth on the master gear 17 and is normally held in engagement therewith by means of a horizontally disposed lever 37 pivotally mounted on a supporting bracket 38 and provided at one end with a locking recess 39 adapted to engage the adjacent face of the bar 33. The opposite end of the lever 37 is cut away as shown and provided with a vertical aperture for the reception of a threaded pin 40, there being a coiled spring 41 interposed between the upper edge of the adjacent plate 10 and the end of the lever 37 for normally retaining the catch 42 in engagement with the brake-bar. Pivotally mounted on the opposite sides of the truck are levers 43 provided with terminal rollers 44 adapted to engage the rims of the traction wheels thereby to exert a braking action on said wheels and assist in stopping the car. The rollers 44 are normally retained out of engagement with the traction wheels by means of coiled springs 45 so that when the free ends of the lever 43 are released the terminal rollers 44 will clear said traction wheels.

The operation of the device is as follows:— When it is desired to start the car the reduced end of the horizontal lever or catch 37 is depressed which releases the brake bar 33 thus permitting the latter to be moved into engagement with the stop pin 46 and the spring to transmit motion through the medium of the train of gears to the driving shaft. To stop the car the wheel brakes are first applied after which the brake-bar is moved into engagement with the teeth on the master gear 17 by pressing the free end of the lever 35.

Attention is called to the fact that by having the upper face of the brake bar 33 inclined or beveled as indicated at 47 when the latter is moved to operative position in engagement with the teeth on the gear wheel 17, the head of the catch 42 will ride over said face until the locking recess 39 is in alinement with the brake bar in which event the coiled spring 41 will force the catch into engagement with said bar and thus automatically lock the brake in set position. When it is desired to reverse the direction of the travel of the car it is merely necessary to exert an outward pull on the reversing lever 27 when the pinion 24 will engage the teeth on the gear wheel 22 and thereby effect the reversal of the car.

From the foregoing description it is thought that the construction and operation of the device may be readily understood by those skilled in the art and further description thereof is deemed unnecessary.

Having thus described the invention what is claimed is:—

1. In a hand car, a truck, a train of gears operatively connected with the axle of the truck, a spring for transmitting motion to the gears, a brake bar adapted to engage the teeth, means for moving the brake to operative and inoperative position, and a spring catch adapted to engage the brake bar for automatically locking the same in set position.

2. In a hand car, a truck, a train of gears operatively connected with the axle of the truck, a spring for transmitting motion to the gears, a crank for regulating the tension of the spring, pawl and ratchet mechanism associated with the crank, a brake bar adapted to engage the teeth on one of the gears, means for automatically locking the bar in set position, and means for reversing the direction of rotation of the axle.

3. In a hand car, a truck, spaced uprights secured to the truck, a train of gears disposed between the uprights and operatively connected with axle of the truck, a winding shaft, a coiled spring one end of which is connected to the winding shaft and the opposite end thereof to one of the gear wheels for transmitting motion to the axle of the truck, a brake adapted to engage the teeth on one of the gears, a catch for locking the brake in set position, and a crank carried by the winding shaft for regulating the tension of the spring.

4. In a hand car, a truck provided with spaced uprights, a plurality of shafts journaled in the uprights, a master gear loosely mounted on one of the shafts, a pinion journaled on the adjacent shaft and meshing with the teeth on the master gear, a gear wheel journaled on a third shaft and meshing with a pinion keyed to and slidably mounted on the axle of the truck, a spring, one end of which is connected to the winding shaft and the opposite end thereof secured to the master gear, for transmitting motion to the axle of the truck, a brake bar pivoted to one of the uprights and adapted to engage the teeth on the master gear, means for locking the brake bar in set position, and means for moving the pinion longitudinally of the shaft to reverse the direction of rotation of the same.

5. In a hand car, a truck provided with spaced uprights, a plurality of shafts journaled in the uprights and includnig a winding shaft, a master gear loosely mounted for rotation on the winding shaft, a gear wheel journaled on the adjacent shaft and provided with a pinion meshing with the master gear, a gear wheel carried by a third shaft and meshing with the pinion, a pinion slidably mounted on the axle of the truck and adapted to engage the last named gear wheel, a housing interposed between the uprights, a spring arranged within the housing and having one end thereof secured to the winding shaft and its opposite end fastened to the master gear, a reversing bar pivotally mounted on the uprights and provided with a yoke adapted to engage and move the pinion longitudinally of the axle truck for reversing the direction of travel of the latter, a horizontally disposed brake bar pivoted to one of the uprights and adapted to engage the teeth on the master gear, a spring actuating catch for locking the brake bar in set position, and levers pivoted to the sides of the truck and provided with terminal rollers adapted to engage the wheels of said truck.

In testimony that I claim the foregoing as my own, I have hereto affixed my signature in the presence of two witnesses:

DAVID N. McDANIEL.

Witnesses:
J. T. WAY,
E. M. HERRIN.